(12) United States Patent
Lin (10) Patent No.: US 9,877,600 B1
(45) Date of Patent: Jan. 30, 2018

(54) STORAGE PLATFORM

(71) Applicants: Dongguan Shichang Metals Factory Ltd., DongGuan (CN); Sortics Manufacturing Associates Co. Ltd., Kaohsiung (TW)

(72) Inventor: Chen-Kang Lin, Kaohsiung (TW)

(73) Assignees: DongGuan ShiChang Metals Factory Co. Ltd. (CN); Sortics Manufacturing Associates Co. Ltd. (TW)

( * ) Notice: Subject to any disclaimer, the term of this patent is extended or adjusted under 35 U.S.C. 154(b) by 0 days.

(21) Appl. No.: 15/354,190

(22) Filed: Nov. 17, 2016

(51) Int. Cl.
| | |
|---|---|
| *A47F 5/08* | (2006.01) |
| *A47B 57/50* | (2006.01) |
| *A47B 5/00* | (2006.01) |
| *A47B 96/02* | (2006.01) |
| *A47B 96/07* | (2006.01) |

(52) U.S. Cl.
CPC ............ *A47F 5/08* (2013.01); *A47B 5/00* (2013.01); *A47B 57/50* (2013.01); *A47B 96/021* (2013.01); *A47B 96/07* (2013.01); *A47B 2005/003* (2013.01)

(58) Field of Classification Search
CPC ....... A47B 57/08; A47B 3/06; A47B 13/0032; A47B 43/003; A47B 43/006; A47B 57/03
USPC ............ 108/42, 110, 153.1, 157.17, 157.16, 108/158.12; 211/118, 189, 117, 175
See application file for complete search history.

(56) References Cited

U.S. PATENT DOCUMENTS

| | | | | |
|---|---|---|---|---|
| 4,706,576 A | * | 11/1987 | James | A47B 57/545 108/106 |
| 4,760,802 A | * | 8/1988 | Leong | A47B 3/06 108/150 |
| 4,821,649 A | * | 4/1989 | Andersson | A47B 57/16 108/107 |
| 5,794,902 A | * | 8/1998 | Henry | A47B 96/028 211/90.01 |
| 5,799,803 A | * | 9/1998 | Muller | A47F 5/0043 108/108 |
| D459,926 S | | 7/2002 | Mikich et al. | |
| 6,435,105 B1 | | 8/2002 | Mikich et al. | |
| D470,353 S | | 2/2003 | Mikich et al. | |

(Continued)

*Primary Examiner* — Jose V Chen
(74) *Attorney, Agent, or Firm* — Luedeka Neely Group, PC (57) ABSTRACT

A suspended storage platform includes a frame having a pair of side rails and a pair of end rails. Each of the side rails and the end rails include an upper lip, a plurality of hangers configured for mounting to an elevated support, and a plurality of suspension members each having a portion mountable to one of the hangers and a portion mountable to one of the side rails and one of the end rails at intersections of the side rails and the end rails. The platform includes a plurality of blow molded shelf panels. Each shelf panel has an upper surface and an opposite lower surface, with the lower surface of each of the shelf panels including a length channel and a width channel formed in the bottom surface adjacent lower peripheral edges of the bottom surface. The length and width channels of the shelf panels seat onto the lips of the side rails and the end rails to provide a snug interference fit with the frame and one another to provide a shelf surface that resists movement during use of the platform once the shelf panels are installed. The shelf panels are configured to be installed onto the frame or removed from the frame without the use of tools.

6 Claims, 13 Drawing Sheets

(56) References Cited

U.S. PATENT DOCUMENTS

| | | |
|---|---|---|
| 6,715,427 B2 | 4/2004 | Mikich et al. |
| 7,128,225 B2 * | 10/2006 | Saltzburg ............... A47B 57/50 |
| | | 211/187 |
| 7,152,535 B2 | 12/2006 | Mikich et al. |
| D537,326 S * | 2/2007 | Wolff ............................ D8/381 |
| 7,252,202 B2 * | 8/2007 | Saltzberg ............... A47B 57/50 |
| | | 211/187 |
| D553,401 S | 10/2007 | Peddycord |
| 7,357,262 B2 | 4/2008 | Fratilla |
| 7,421,957 B2 * | 9/2008 | Baez ........................ E04H 6/42 |
| | | 108/149 |
| 7,895,955 B2 | 3/2011 | Ferder et al. |
| 8,245,651 B1 | 8/2012 | Mikich et al. |
| D697,785 S | 1/2014 | Davis |
| 8,657,130 B2 | 2/2014 | Thrush et al. |
| 8,985,350 B2 | 3/2015 | Thrush et al. |
| 9,474,363 B1 * | 10/2016 | Orsini ....................... A47B 3/06 |
| D781,063 S * | 3/2017 | Shah ............................. D6/513 |
| 2007/0007223 A1 | 1/2007 | Thrush et al. |
| 2008/0184917 A1 * | 8/2008 | Liu ...................... A47B 13/003 |
| | | 108/157.16 |
| 2008/0245281 A1 * | 10/2008 | Willy .................. A47B 13/003 |
| | | 108/157.16 |
| 2015/0060374 A1 | 3/2015 | Mansor |

\* cited by examiner

STORAGE PLATFORM

FIELD

This present disclosure relates to storage platforms. More particularly, the disclosure relates to a storage platform of the type that suspends from a ceiling or the like and having improved structure and aesthetics.

BACKGROUND

Storage platforms of the type that suspend from overhead structures such as ceilings desire improvement. Many overhead platforms are made using wire grids. This construction has many disadvantages, including rusting of the wire, excessive weight, and a generally undesirable appearance. Also, many structure platforms are overly complicated to manufacture, requiring many differently configured components.

The present disclosure relates to an improved suspended storage platform having improved construction, reduced weight, and improved aesthetics.

SUMMARY

The disclosure advantageously provides improved suspended storage platforms.

In one aspect, a storage platform according to the disclosure includes a frame having a pair of side rails and a pair of end rails. Each of the side rails and the end rails includes an upper lip, a plurality of hangers configured for mounting to an elevated support, and a plurality of suspension members each having a portion mountable to one of the hangers and a portion mountable to one of the side rails and one of the end rails at intersections of the side rails and the end rails.

The platform includes a plurality of blow molded shelf panels. Each shelf panel has an upper surface and an opposite lower surface, with the lower surface of each of the shelf panels including a length channel and a width channel formed in the bottom surface adjacent lower peripheral edges of the bottom surface. The length and width channels of the shelf panels seat onto the lips of the side rails and the end rails to provide a snug interference fit with the frame and one another to provide a shelf surface that resists movement during use of the platform once the shelf panels are installed. The shelf panels are configured to be installed onto the frame or removed from the frame without the use of tools.

In another aspect, a storage platform according to the disclosure includes a suspended storage platform having a frame including a plurality of rails. Each rail has an upper lip, a plurality of hangers configured for mounting to an elevated support, and a plurality of suspension members each having a portion mountable to one of the hangers and a portion mountable to the rails.

The platform includes a plurality of shelf panels, each of the shelf panels being of blow molded construction and having an upper surface and an opposite lower surface, with the lower surface of each of the shelf panels including a length channel and a width channel formed in the bottom surface adjacent lower peripheral edges of the bottom surface. The length and width channels of the shelf panels seat onto the lips of the rails to provide a snug interference fit with the frame and one another to provide a shelf surface that resists movement during use of the platform once the shelf panels are installed. The shelf panels are configured to be installed onto the frame or removed from the frame without the use of tools.

BRIEF DESCRIPTION OF THE DRAWINGS

Further advantages of the disclosure are apparent by reference to the detailed description in conjunction with the figures, wherein elements are not to scale so as to more clearly show the details, wherein like reference numbers indicate like elements throughout the several views, and wherein.

DETAILED DESCRIPTION

With initial reference to FIGS. 1-5, the disclosure relates to a storage platform 10 having a frame 12 supporting a plurality of inner shelf panels 14 and corner shelf panels 16. The storage platform 10 is advantageously configured to have improved structure, function and aesthetics.

Figure 1:
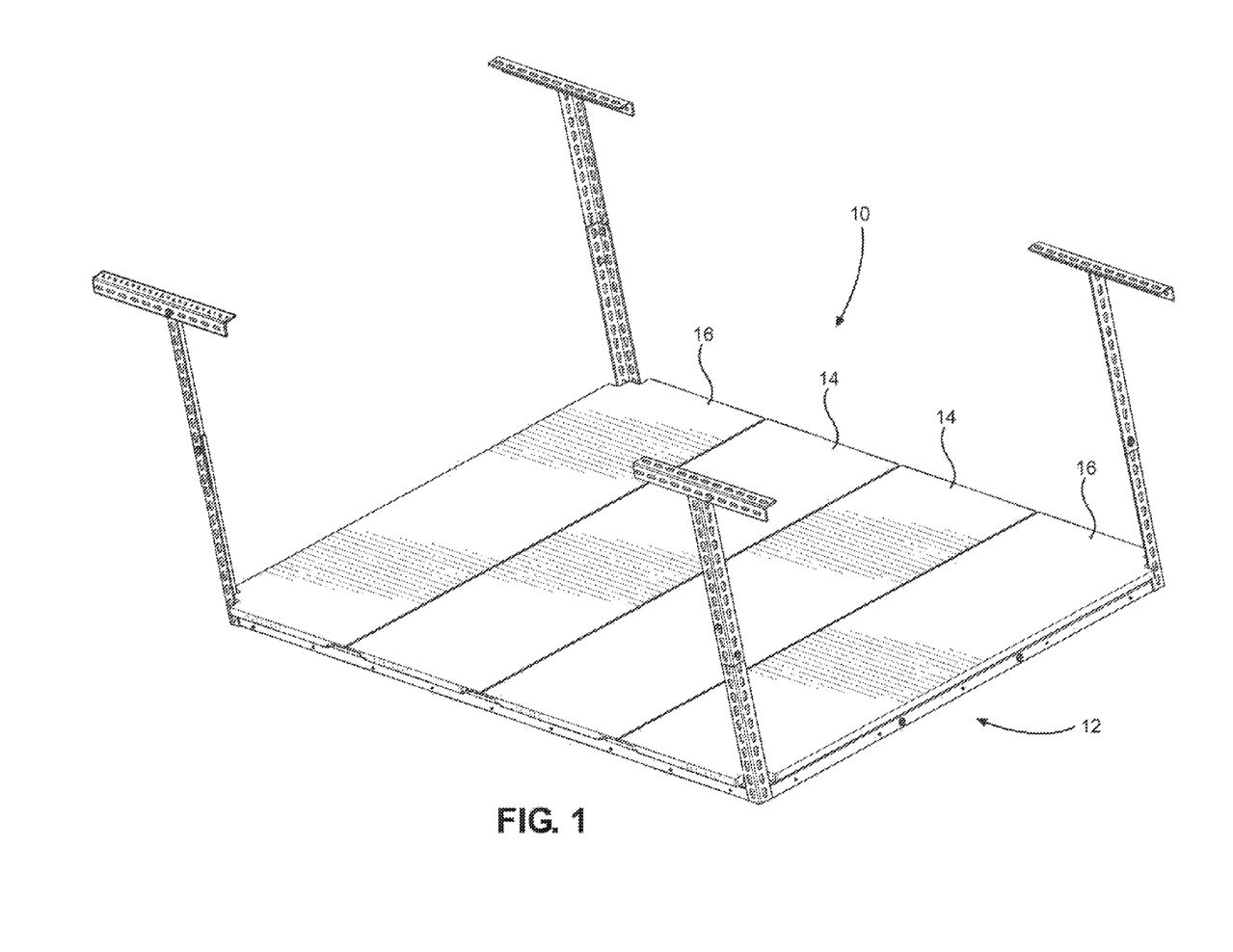
FIG. 1 is a perspective view of a storage platform according to the disclosure.
Figure 2:
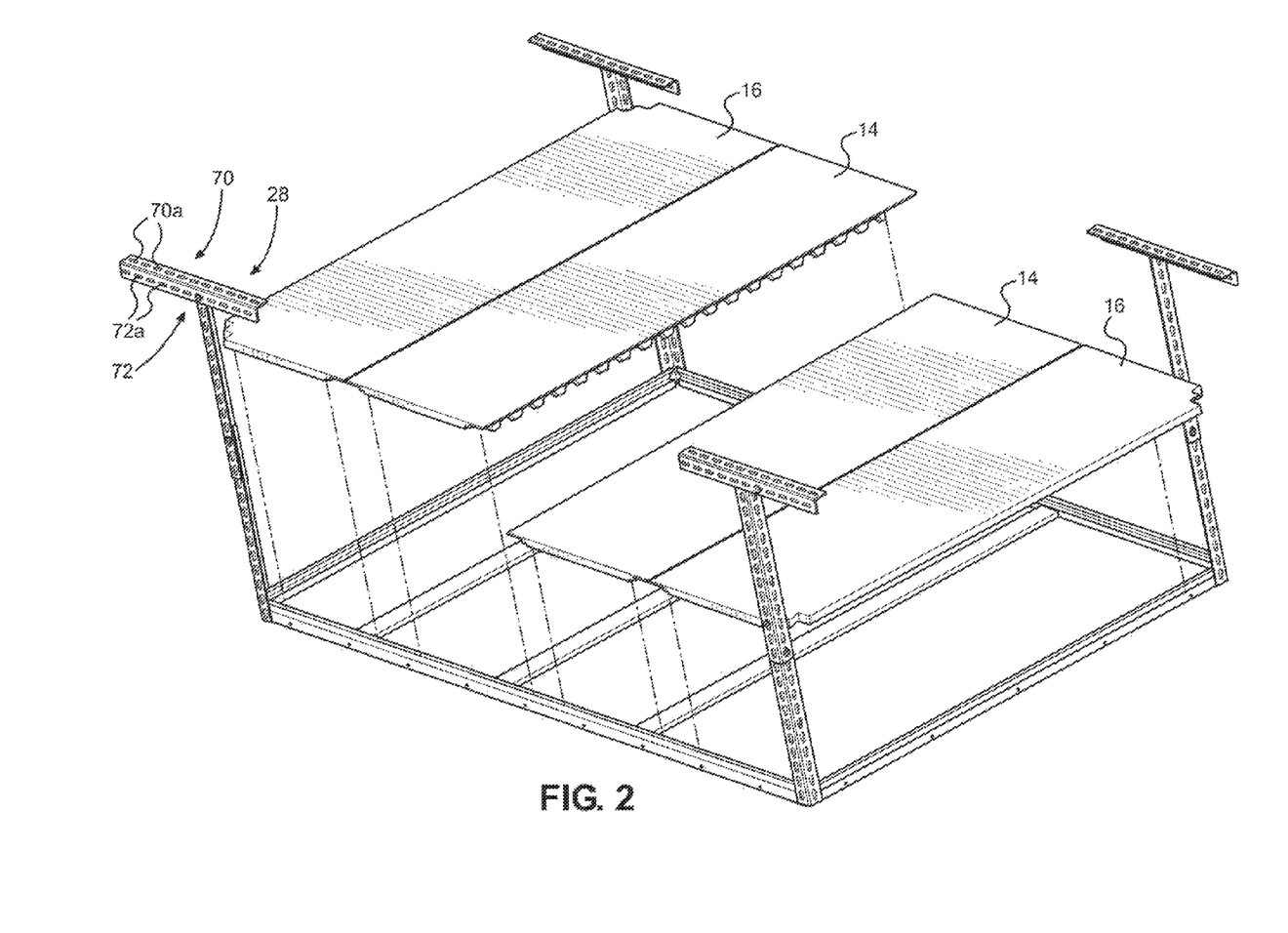
FIG. 2 is a partially exploded perspective view of the storage platform of FIG. 1.
Figure 3:
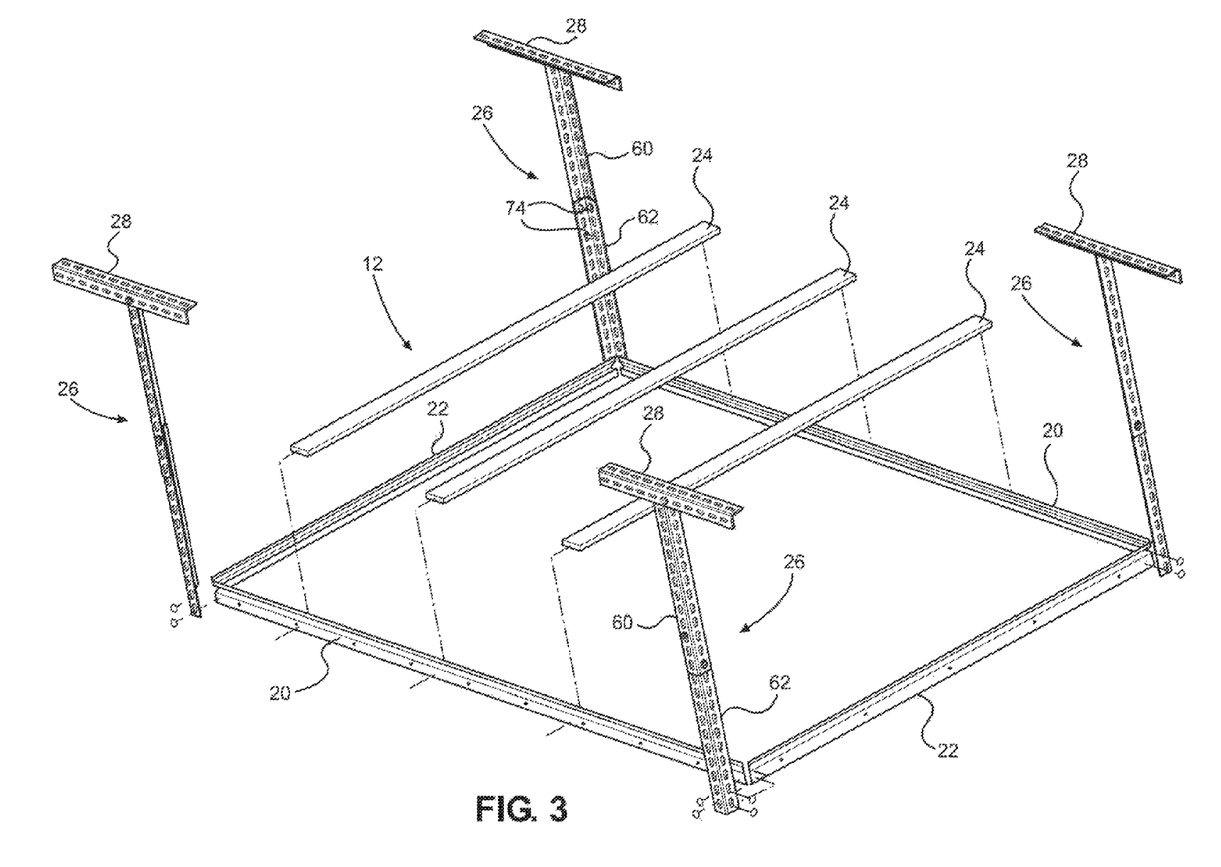
FIG. 3 is a partially exploded perspective view of a frame component of the storage platform of FIG. 1.

The frame 12 is configured for suspending the storage platform 10 from a ceiling or the like. The frame 12 includes side rails 20, end rails 22, cross supports 24, adjustable suspension members 26, and hangers 28. Each of the components is formed of a sturdy and rigid structural material. Steel is preferred structural material. It will be appreciated that the platform 10 may be provided in a variety of sizes, with variations in the number of panels and supports. For most uses, the platform 10 is configured to have a width ranging from 2 feet to 4 feet, and a width ranging from 4 to 8 feet. However, it will be appreciated that the platform 10 may be provided in virtually any size.

With additional reference to FIGS. 6-9, the side rails 20 are each desirably formed as by pressing or stamping a flat metal member, such as aluminum, in a form to provide a lower flat section 30, an interior projection 32, and an upper lip 34. It will be appreciated that the rails 20 may be formed of non-metal materials as well. The interior projection 32 provides rigidity to the rail 20, and also provides a stop for locating the cross supports 24, as described more fully below. The upper lip 34 cooperates with the shelf panels 14, as described more fully below. The lower flat section 30 also desirably includes spaced apart apertures 36 along its length for providing locations for hanging storage hooks or the like. Outward facing mounts 38 are desirably located on the lower flat section 30 at each end of the rails 20 for cooperating with the suspension members 26 as described more fully below. The mounts 38 are desirably provided as by pop rivets having an enlarged exterior head extending from a smaller shaft. It will be appreciated that the mounts 38 may be made of other materials or structure providing mount structures for cooperating with the suspension members 26.

The end rails 22 are substantially identical in profile to the side rails 20 and formed in the same manner. This advantageously enables a single manufacturing process for shaping the side rails 20 and the end rails 22. If the frame 12 is made square, the side rails 20 and the end rails 22 may be identical. If the frame 12 is to be rectangular, the only difference would be in the respective lengths of the side rails 20 and the end rails 22. Accordingly, the end rails 22 to include a lower flat section 40, an interior projection 42, and an upper lip 44. The lower flat section 40 also desirably includes spaced apart apertures 46 along its length for providing locations for hanging storage hooks or the like, and the lower flat sections 40 of the ends of the end rails 22 include outward facing mounts 48. The side rails 20 and the end rails 22 are desirably configured and arranged so that the mounts 38 and 48 thereof connect to the suspension members 26 at common corners to provide a rectangular or square shape, depending on their relative lengths.

Figure 16:
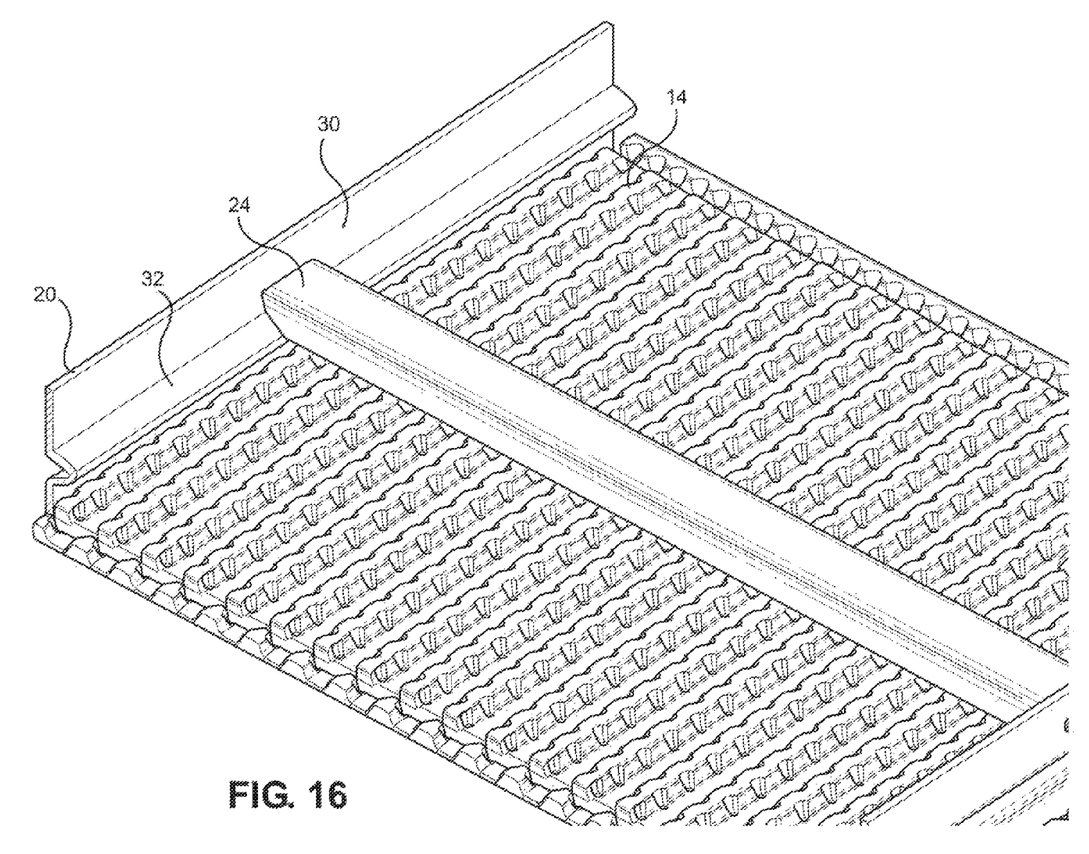

The cross supports 24 are desirably of tubular steel construction and are configured to have an upper flat shelf panel support surface 50. The cross supports 24 are also configured to have a length so as to extend between the interior facing surfaces of opposed ones of the side rails 20 of the assembled frame 12. The ends of the cross supports 24 are desirably shaped to matingly abut the lower flat portions 30 and the interior projections 32 of the side rails 20, as shown in FIG. 16. It will be appreciated that the cross supports 24 may be made in other shapes, such as a u-channel shape, and may be made of materials other than steel or metal.

The ends of the supports 24 are also configured to receive threaded fasteners. For example, the ends of the side rails 20 may include caps or the like welded or otherwise fitted thereon flush with the ends and configured to have a threaded aperture for cooperating with threaded fasteners 52 or the like for mounting the cross supports 24 between the side rails 20. The cross supports 24 are desirably located to abut the interior projections 32 of the side rails 20 for enhancing rigidity of the frame 12.

The adjustable suspension members 26 are each provided as by a pair of elongate L-shaped bracket 60 and 62 aligned in length in a partially and adjustably overlapping relationship. The brackets 60 and 62 each have a pair flat surfaces. Each flat surface of the bracket 60 includes a single row of attachment holes 60a and each flat surface of the bracket 62 includes a single row of attachment holes 62a, respectively. The holes 62a serve as receivers for the mounts 38 and 48 of the rails 20 and 22.

Figure 8:
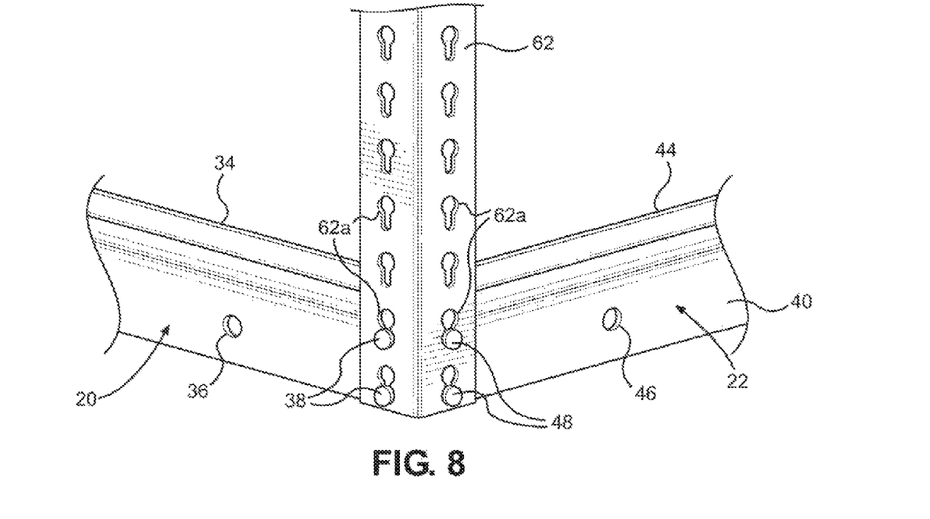
FIG. 8 is a front perspective view of another portion of the frame of the storage platform of FIG. 1.
Figure 9:
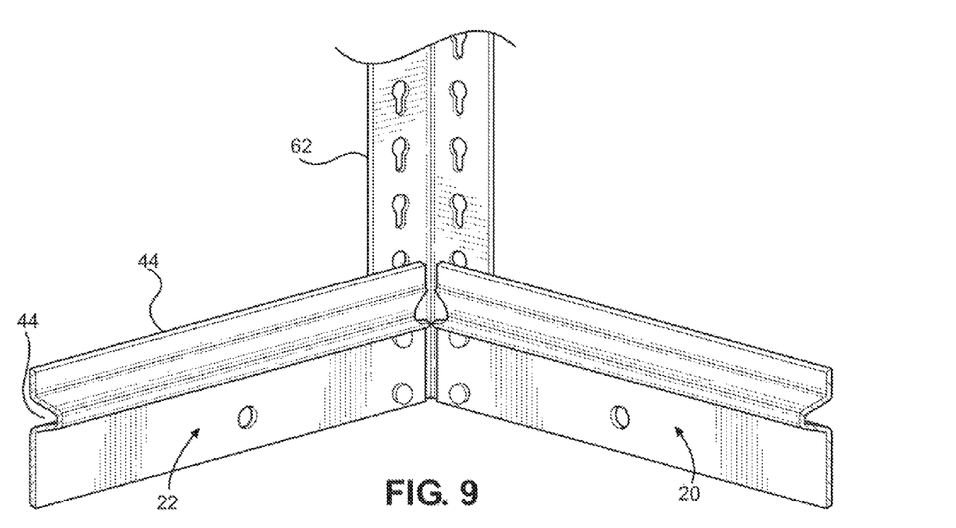
FIG. 9 is a rear perspective view of the portion of the frame of FIG. 8.
Figure 10:
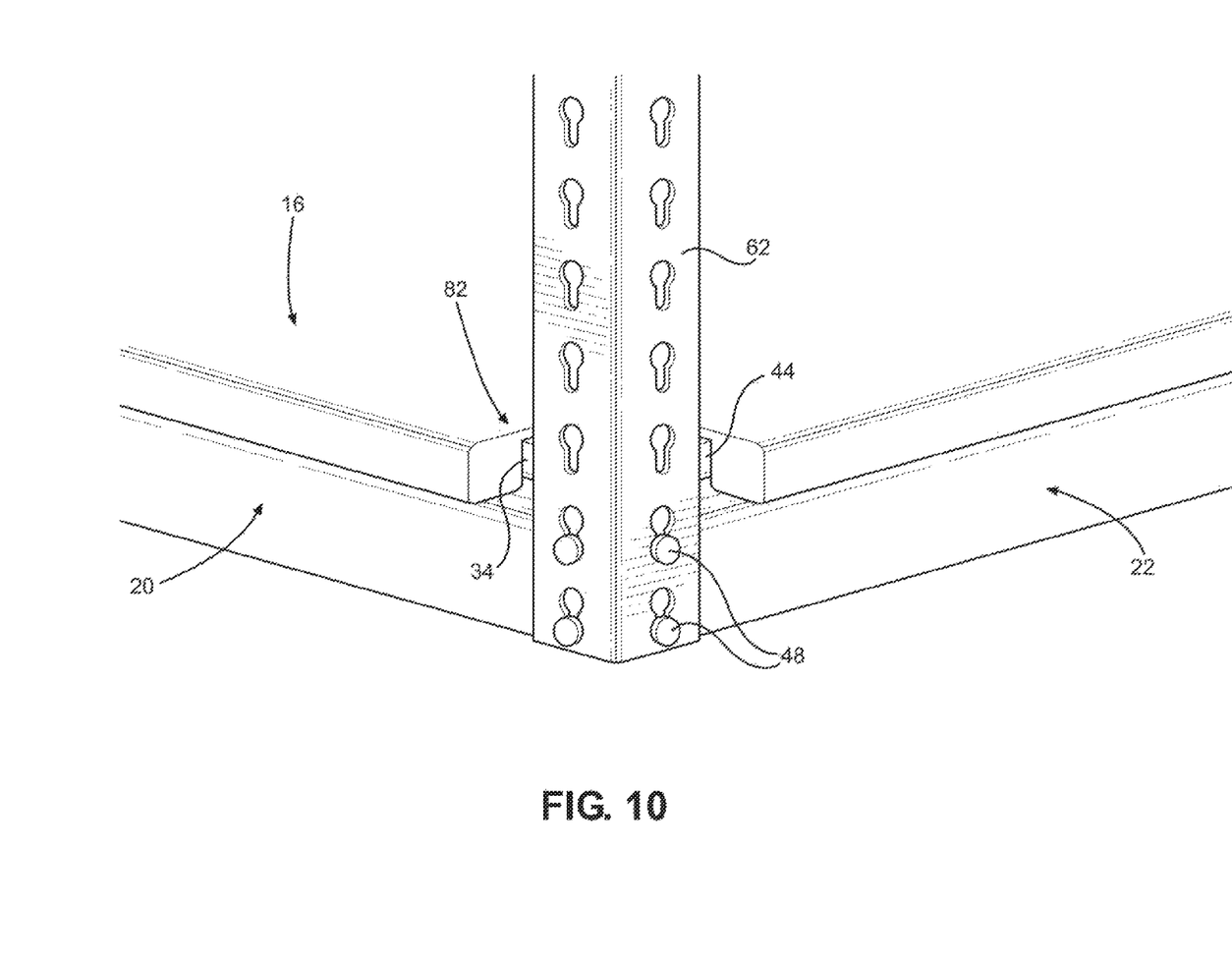
FIG. 10 is a front perspective view showing installation of a shelf panel onto a corner of the frame of the storage platform of FIG. 1.

The brackets 60 and 62 are slidably adjustable relative to one another to vary the overall length of the suspension member 26. Fasteners 64 may be secured between the aligned attachment holes of the brackets 60 and 62 to fix the suspension member 26 at a desired length. Each bracket 62 connects to one of the side rails 20 and one of the end rails 22 at a corner of the frame 12, as seen in FIGS. 8-10. As shown, the attachment holes 62a of the bracket 62 receive the mounts 38 of the side rail 20 and the mounts 48 of the end rail 22. To permit the desired adjustability of the bracket 62 relative to the mounts 38 and 48, the holes 62a are desirably formed as keyhole slots.

The mounts 38 and 48 may be selectively engaged with the bracket 62 by adjusting which of the holes 62a along the length of the bracket 62 are engaged with the mounts 38 and 48. In this manner, the distance of the frame 12 from the hangers 28, and hence the ceiling from which the frame 12 is mounted, may be easily adjusted.

The hangers 28 are each provided as by an elongate L-shaped bracket having a pair of flat surfaces 70 and 72. The flat surface 70 includes a single row of attachment holes 70a, and the flat surface 72 includes a single row of attachment holes 72a. The attachment holes 70a and 72a are desirably formed as keyhole slots. The flat surface 70 is mounted to a surface, such as a ceiling, as by passing fasteners through several of the attachment holes 70a. The flat surface 72 is connected to the end of one of the adjustable suspension members 26 as by preferably centering the end of one of the suspension members 26 perpendicular to the flat surface 72 and aligning the closest one of the holes 72a with a corresponding hole on the end of the suspension member 26 and passing a fastener through the aligned holes.

The frame 12 is assembled and installed as by initially assembling the side rails 20 and the cross supports 24 and securing them together using the fasteners 52. Next, the hangers 28 are installed onto a support, such as a ceiling surface, at locations corresponding to the corners of the frame 12. This may be accomplished for each of the hangers 28 by placing the flat surface 70 of the hanger 28 against the ceiling at a location aligned with a joist, stud or the like, and passing fasteners such as wood screws through several of the attachment holes 70a. The lengths of the hangers 28 are desirably configured to be sufficient and to be arranged so as to span sufficient distance so that the hangers 28 are each securable to a stud or joist of the like of the ceiling.

Once the hangers 28 are installed, the suspension members 26 are installed onto the hangers 28 using fasteners. The lengths of each suspension member 26 are preferably telescopically pre-adjusted so that each is the same length at a desired length. The assembled side rails 20 and the cross supports 24 are then hung onto the hangers 28 by fitting the mounts 38 of the side rails 22 into the holes 62a of the suspension members 26. The end rails 22 are then installed onto the suspension members 26 by placing the mounts 40 of the end rails 22 into the holes 62a of the suspension members 26, which completes installation of the frame 12. It will be appreciated that the frame 12 may be assembled and installed in other steps and sequences. Once the frame 12 is assembled and installed, the shelf panels 14 and 16 are installed onto the frame 12 to complete assembly and installation of the platform 10.

Returning to FIGS. 4-5, and with additional reference to FIGS. 11-16, the shelf panels 14 and 16 are each desirably formed of blow molded plastic construction. This provides shelf panels 14 and 16 that are lightweight, do not rust, and offer improved aesthetics.

Figure 4:
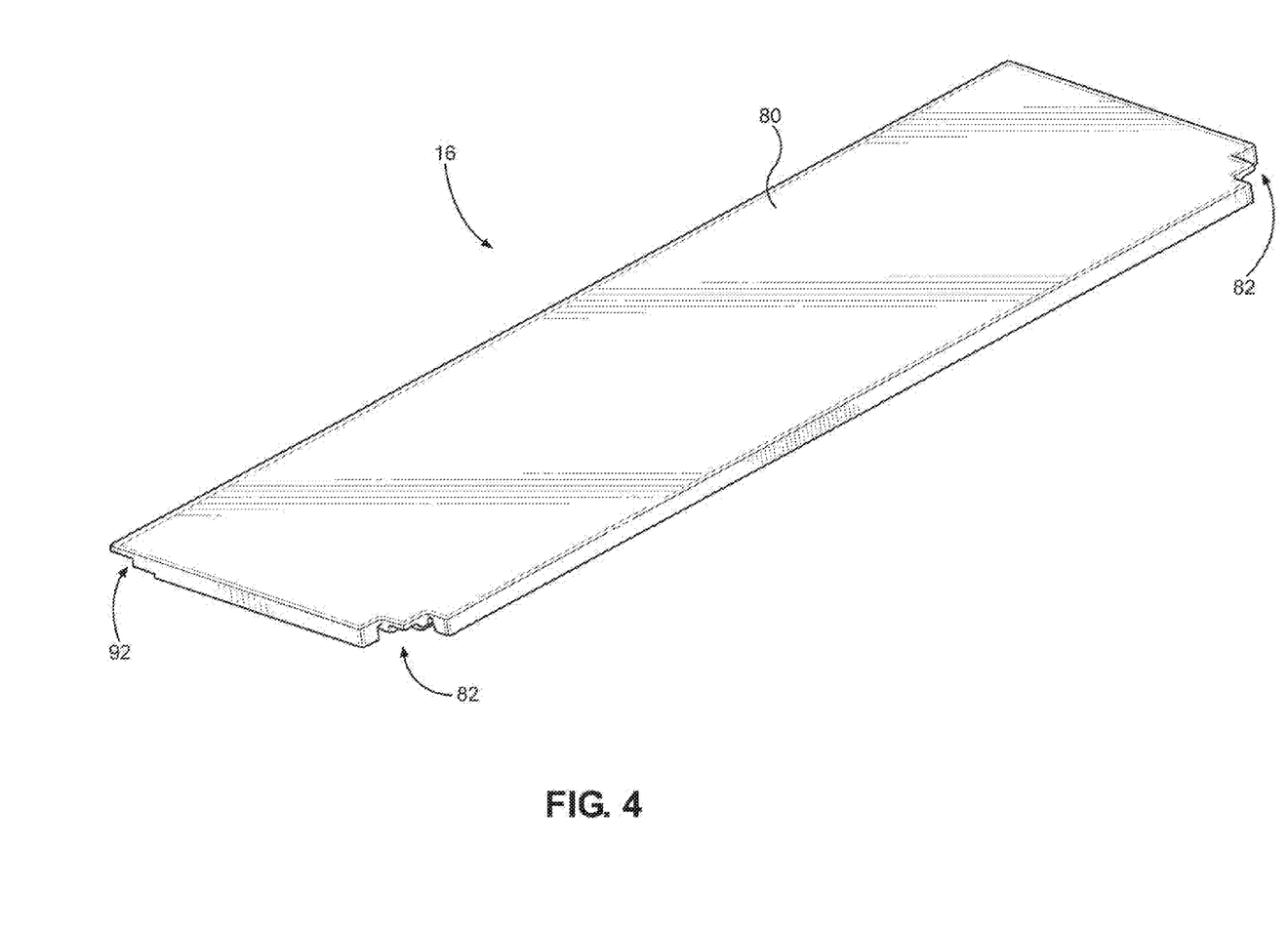
FIG. 4 is an upper perspective view of a shelf panel component of the storage platform of FIG. 1.
Figure 5:
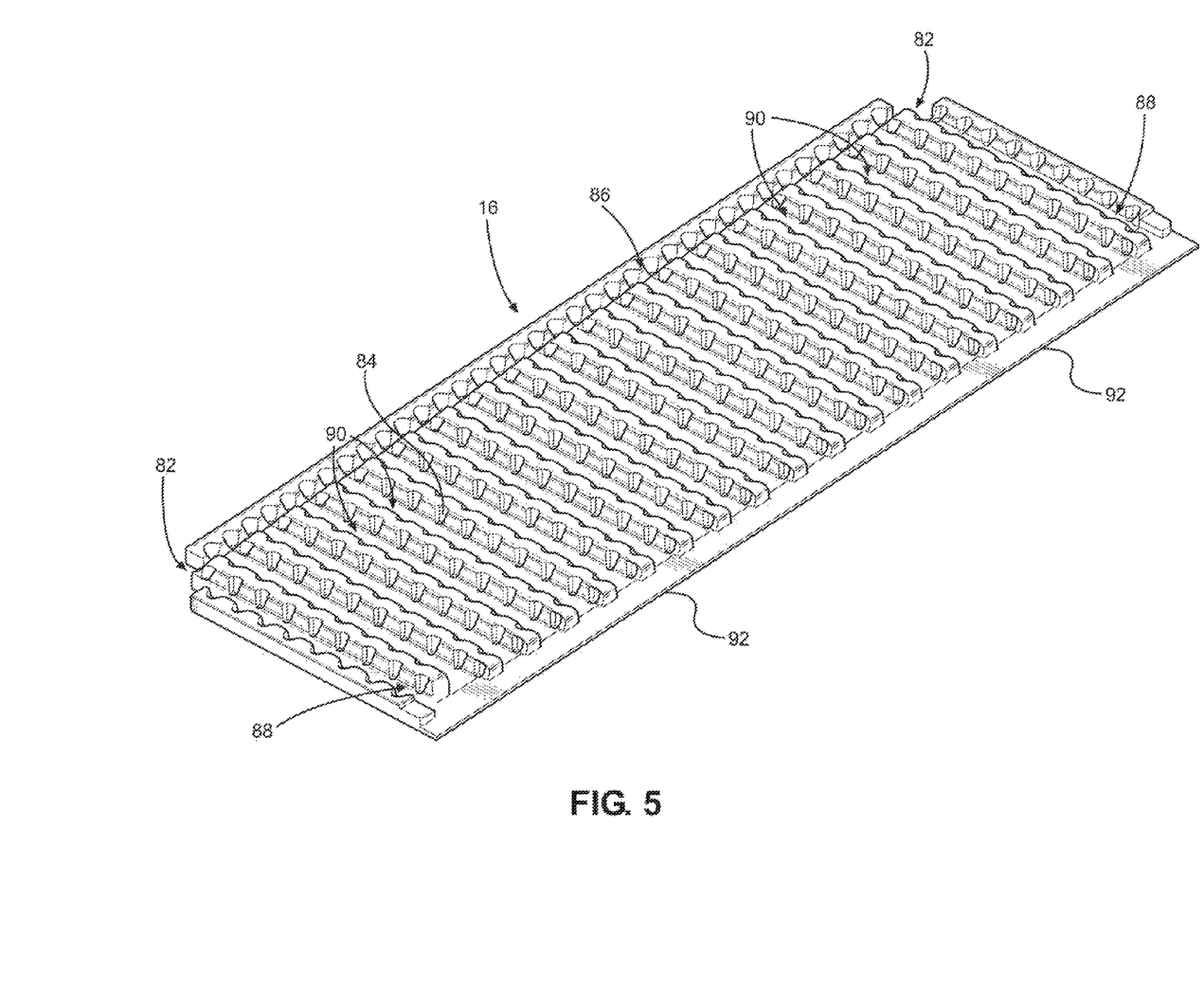
FIG. 5 is a lower perspective view of a shelf panel component of the storage platform of FIG. 1.
Figure 6:
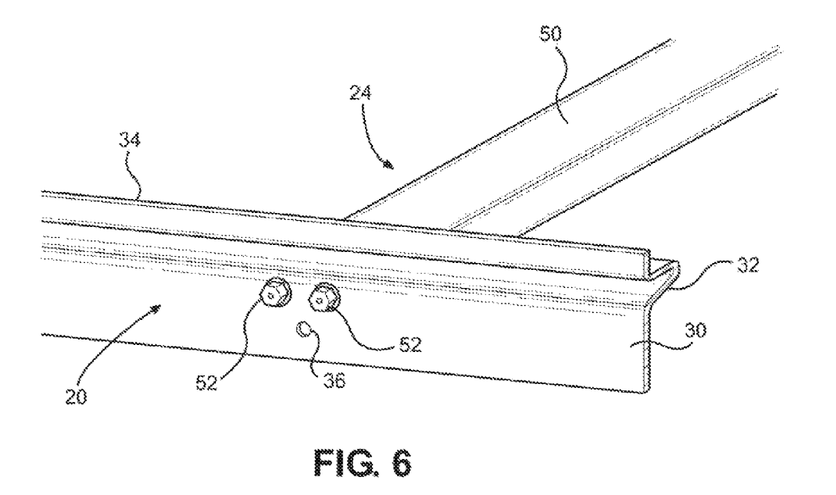
FIG. 6 is an upper perspective view of a portion of the frame of the storage platform of FIG. 1.
Figure 7:
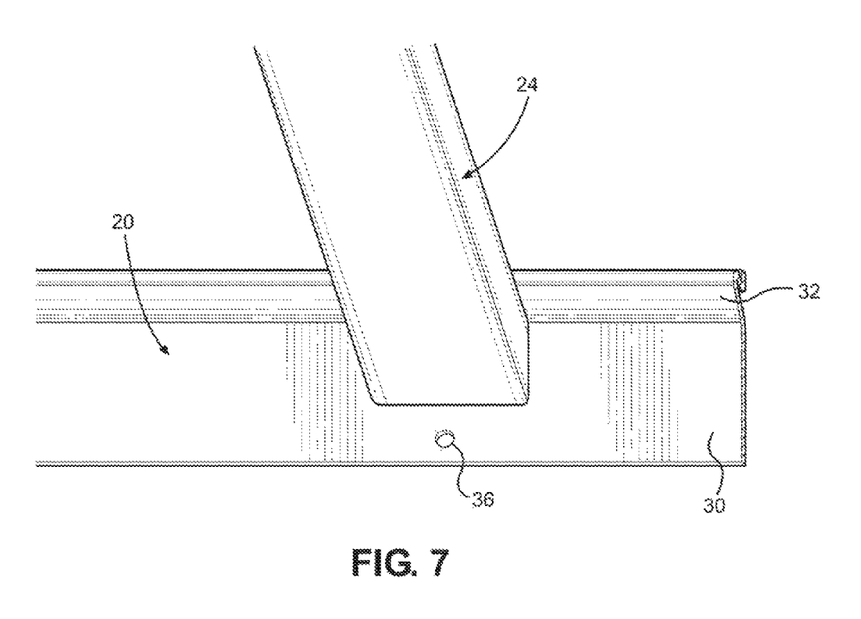
FIG. 7 is a lower perspective view of the portion of the frame of FIG. 6.

Each of the shelf panels 14 and 16 is rectangular in shape and includes a flat or planar upper surface 80 for storage of items. The corner panels 16 include contoured cutouts defining corners 82 for mounting of the panels 16 to the frame 12. The panels 14 and 16 could be square if used with a square frame. A bottom surface 84 of the panels 14 and 16 includes a length channel 86 adjacent one peripheral length edge and width channels 88 formed adjacent lower peripheral side edges of the bottom surface 84 for mounting of the panels 14 and 16 to the frame 12. To reduce the amount of plastic material required for forming the panels 14 and 16, the bottom surface 84 preferably includes relief or void areas 90. A flat 92 is defined along the edge of the bottom surface 84 of the panels 14 and 16 opposite the length channel 86 for conforming to the profile of the cross supports 24. As noted, the shelf panels 14 and 16 are substantially the same, except for the corners 82 in the panels 16.

Figure 11:
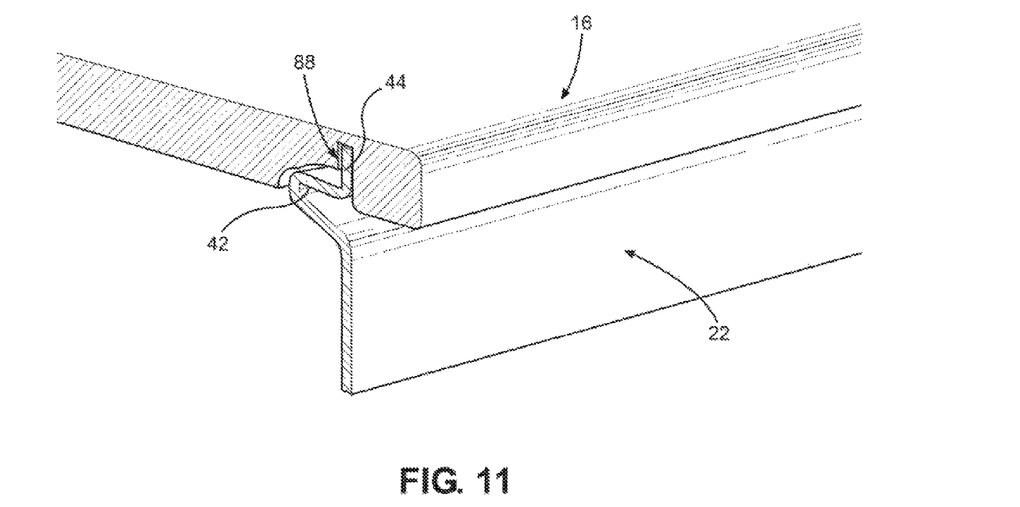
FIGS. 11-13 are detailed views showing installation of shelf panels onto the frame of the storage platform of FIG. 1.
Figure 12:
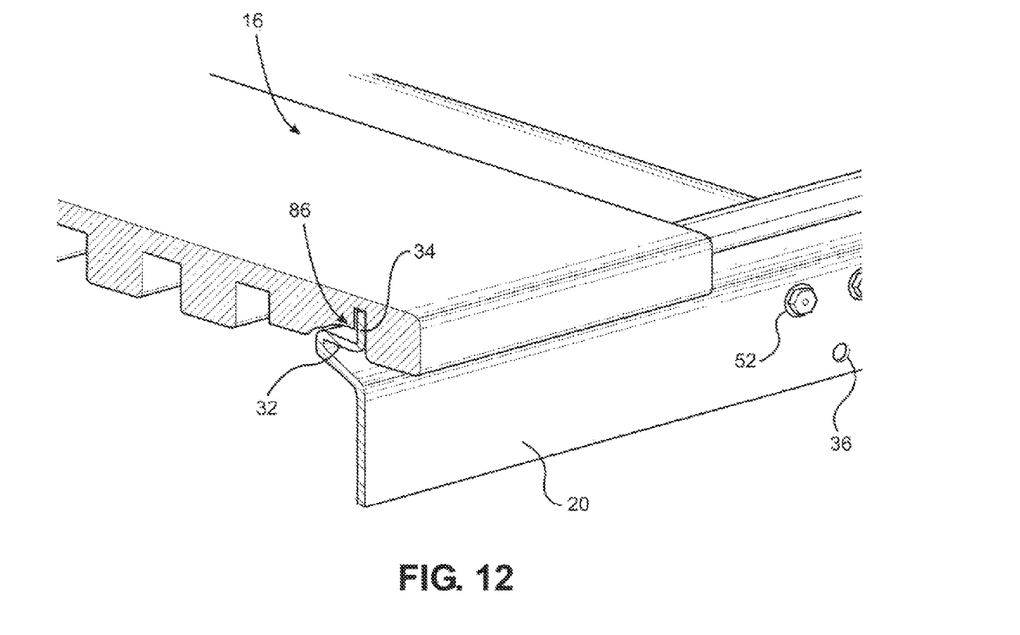
Figure 13:
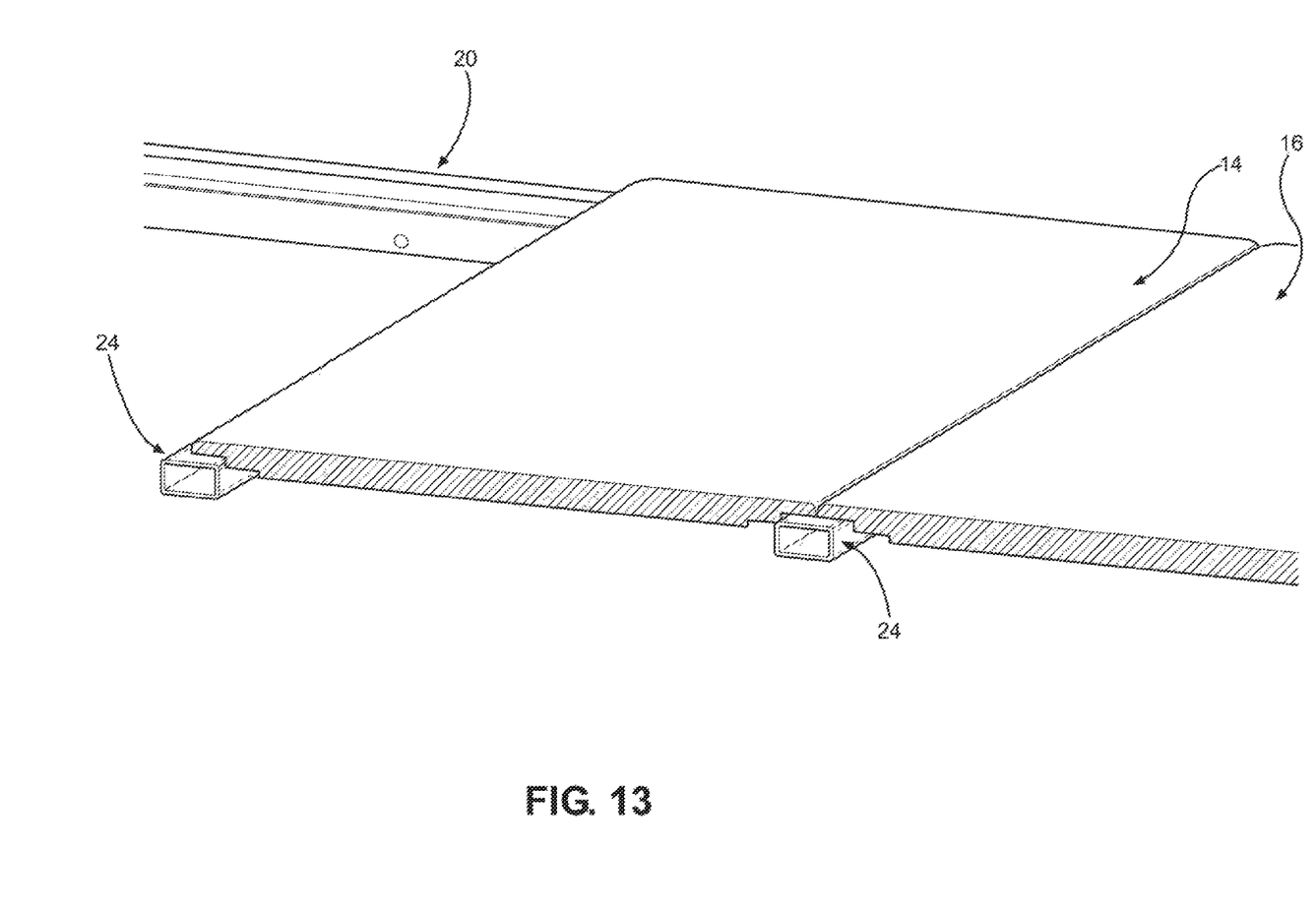
Figure 14:
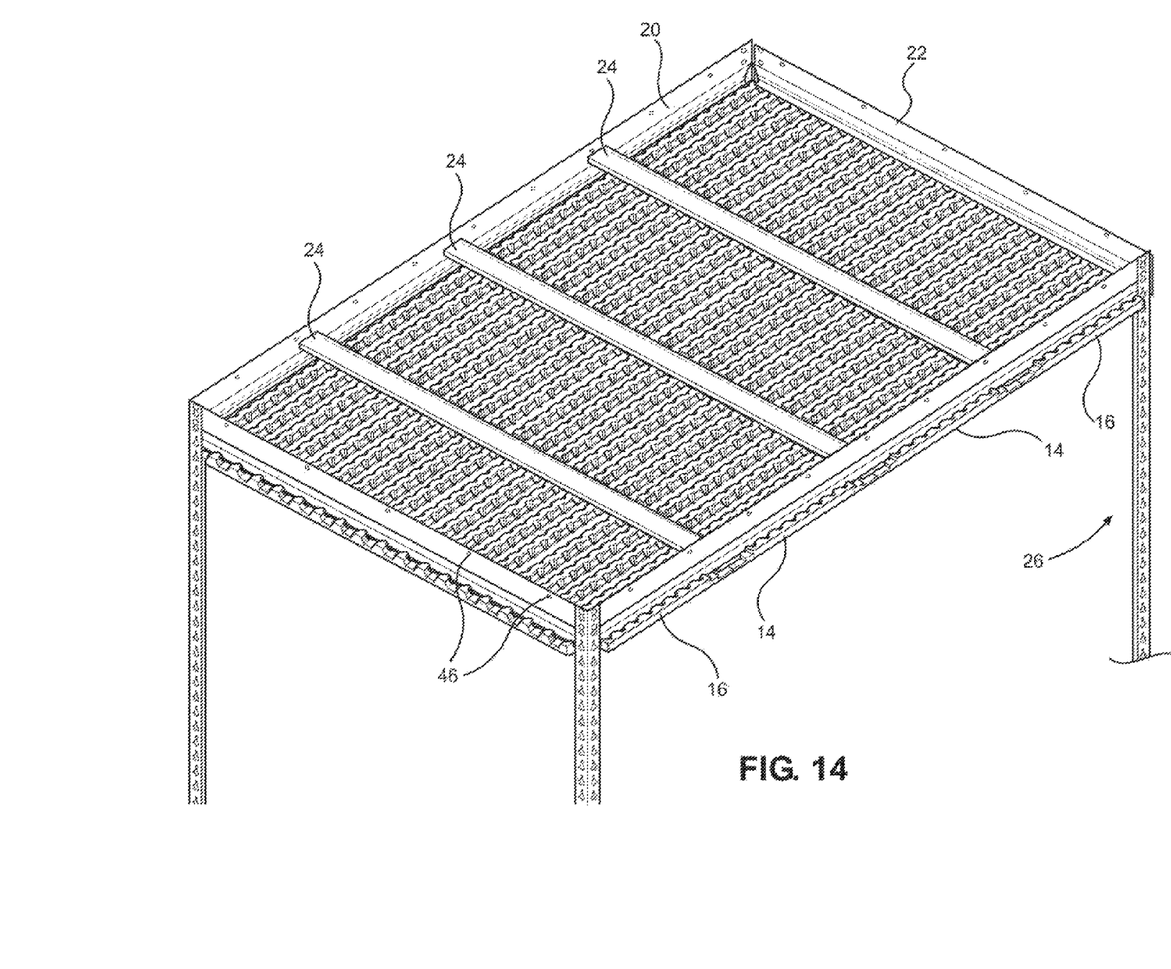
FIGS. 14-16 are lower perspective views of the storage platform of FIG. 1.
Figure 15:
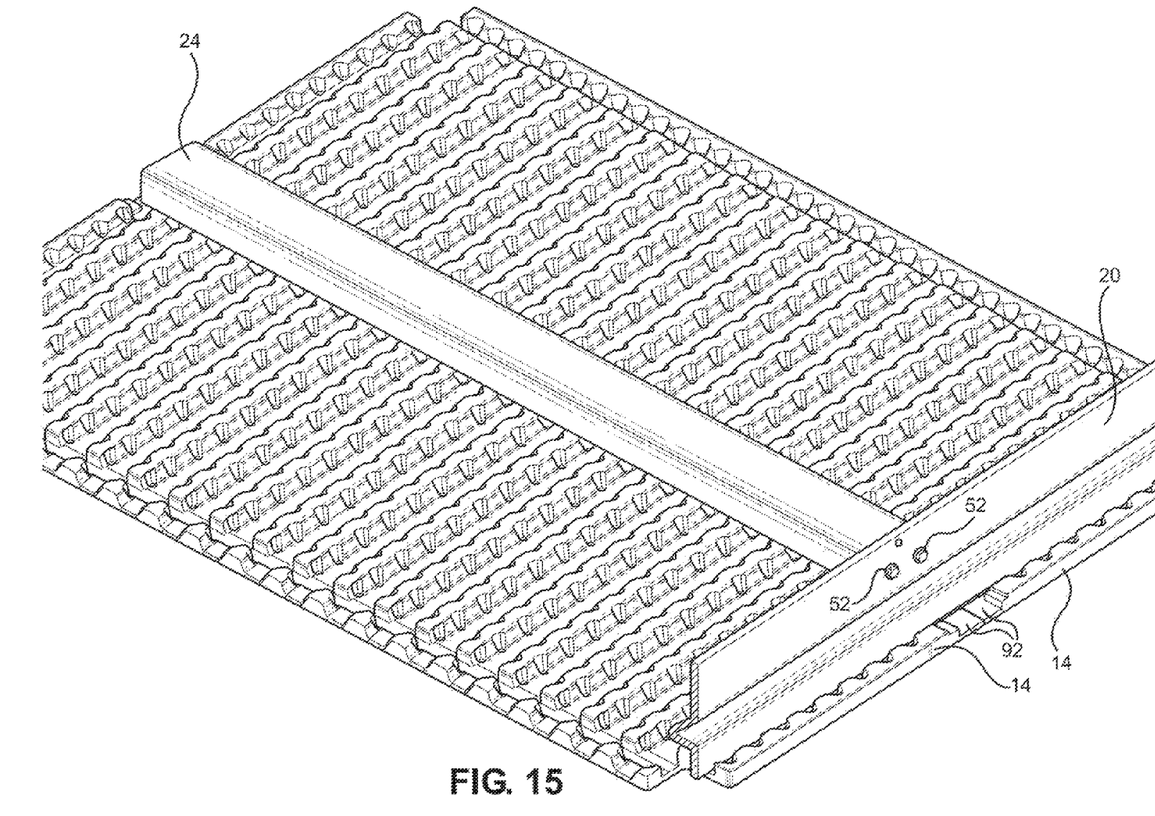

The shelf panels 14 and 16 are preferably installed on the frame 12 by placing one of the shelf panels 16 onto the frame 12 at one of the ends with the corners 82 of the panel 16 adjacent opposite ones of the lower brackets 62 of the suspension members 26, such as shown in FIG. 10. As the panel 16 is seated onto the frame 12, the corner 82 nestles around the lower bracket 62 and the channel 86 and channels 88 seat onto the lips 34 and 44 and projections 32 and 42 of the side rails 20 and the end rails 22, respectively, as shown in FIGS. 11 and 12. The interior panels 14 are then positioned on the frame 12 in a similar manner so that the channels 86 and 88 seat onto the lips 34 and 44 and projections 32 and 42 of the side rails 20 and the end rails 22. The other panel 16 is then installed in a similar manner. The supports 24 are desirably spaced so that the flats 92 of the panels 14 and 16 rest on the supports 24.

The panels 14 and 16 are configured to provide a snug interference fit with the frame 12 and one another to provide a shelf surface that resists movement during use of the platform 10 once the shelf panels 14 and 16 are installed. However, as will be appreciated, the shelf panels 14 and 16 may be readily installed or removed without the use of tools.

Accordingly, the platform 10 according to the disclosure has improved construction and utilizes side rails and end rails that are commonly configured, as well as blow molded shelf panels that are commonly configured. This reduces manufacturing costs and simplifies assembly and installation of the platform. Such construction also offers additional benefits and aesthetics.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A suspended storage platform, comprising:
 a frame comprising:
 a pair of side rails and a pair of end rails, each of the side rails and the end rails having an upper lip, a plurality of hangers configured for mounting to an elevated support, and a plurality of suspension members each having a portion mountable to one of the hangers and a portion mountable to one of the side rails and one of the end rails at intersections of the side rails and the end rails; and
 a plurality of shelf panels, each of the shelf panels being of blow molded construction and having an upper surface and an opposite lower surface, with the lower surface of each of the shelf panels including a length channel and a width channel formed in the bottom surface adjacent lower peripheral edges of the bottom surface,
 wherein the length and width channels of the shelf panels seat onto the lips of the side rails and the end rails to provide a snug interference fit with the frame and one another to provide a shelf surface that resists movement during use of the platform once the shelf panels are installed, and
 wherein the shelf panels are configured to be installed onto the frame or removed from the frame without the use of tools.

2. The storage platform of claim 1, wherein exterior portions of the ends of the side rails and the end rails each include mounts projecting therefrom, and lower portions of the suspension members include receivers for engaging the mounts.

3. The storage platform of claim 1, wherein the suspension members are slidingly adjustable in length.

4. The storage platform of claim 1, wherein the side rails further include interior projections and the frame includes cross supports which span between the side rails and abut the interior projections of the side rails.

5. The storage platform of claim 1, wherein the end rails are substantially identical in profile to the side rails.

6. A suspended storage platform, comprising:
 a frame comprising:
 a plurality of rails each having an upper lip, a plurality of hangers configured for mounting to an elevated support, and a plurality of suspension members each having a portion mountable to one of the hangers and a portion mountable to the rails; and
 a plurality of shelf panels, each of the shelf panels being of blow molded construction and having an upper surface and an opposite lower surface, with the lower surface of each of the shelf panels including a length channel and a width channel formed in the bottom surface adjacent lower peripheral edges of the bottom surface,
 wherein the length and width channels of the shelf panels seat onto the lips of the rails to provide a snug interference fit with the frame and one another to provide a shelf surface that resists movement during use of the platform once the shelf panels are installed, and
 wherein the shelf panels are configured to be installed onto the frame or removed from the frame without the use of tools.

\* \* \* \* \*